US012131466B2

(12) United States Patent
Sheoran et al.

(10) Patent No.: US 12,131,466 B2
(45) Date of Patent: Oct. 29, 2024

(54) METHOD AND SYSTEM FOR DOMAIN KNOWLEDGE AUGMENTED MULTI-HEAD ATTENTION BASED ROBUST UNIVERSAL LESION DETECTION

(71) Applicant: Tata Consultancy Services Limited, Mumbai (IN)

(72) Inventors: Manu Sheoran, Noida (IN); Meghal Dani, Noida (IN); Monika Sharma, Noida (IN); Lovekesh Vig, Noida (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 400 days.

(21) Appl. No.: 17/806,402

(22) Filed: Jun. 10, 2022

(65) Prior Publication Data
US 2023/0177678 A1 Jun. 8, 2023

(30) Foreign Application Priority Data

Nov. 3, 2021 (IN) .............................. 202121050603

(51) Int. Cl.
G06T 7/00 (2017.01)
G06V 10/25 (2022.01)
(Continued)

(52) U.S. Cl.
CPC ............ *G06T 7/0012* (2013.01); *G06V 10/25* (2022.01); *G06V 10/26* (2022.01); *G06V 10/454* (2022.01);
(Continued)

(58) Field of Classification Search
CPC .................... G16H 50/20; G16H 30/40; G06T 2207/10081; G06T 2207/20081;
(Continued)

(56) References Cited

U.S. PATENT DOCUMENTS 11,410,309 B2 * 8/2022 Cai .......................... G06T 7/248
2015/0230773 A1 * 8/2015 Cho ........................ A61B 6/502
382/128

(Continued)

FOREIGN PATENT DOCUMENTS

CN 112241766 A * 1/2021 ............. G06K 9/342

OTHER PUBLICATIONS

Shao et al., "Attentive CT Lesion Detection Using Deep Pyramid Inference with Multi-Scale Booster" (Year: 2019).*

(Continued)

Primary Examiner — Dung Hong
(74) Attorney, Agent, or Firm — FINNEGAN, HENDERSON, FARABOW, GARRETT & DUNNER LLP

(57) ABSTRACT

State of the art deep network based Universal Lesion Detection (ULD) techniques inherently depend on large number of datasets for training the systems. Moreover, these system are specifically trained for lesion detection in organs of a Region of interest (RoI) of a body. Thus, requires retraining when the RoI varies. Embodiments herein disclose a method and system for domain knowledge augmented multi-head attention based robust universal lesion detection. The method utilizes minimal number of Computer Tomography (CT) scan slices to extract maximum information using organ agnostic HU windows and a convolution augmented attention module for a computationally efficient ULD with enhanced prediction performance.

12 Claims, 15 Drawing Sheets

(51) Int. Cl.
*G06V 10/26* (2022.01)
*G06V 10/44* (2022.01)
*G06V 10/778* (2022.01)

(52) U.S. Cl.
CPC .. *G06V 10/778* (2022.01); *G06T 2207/10081* (2013.01); *G06T 2207/30096* (2013.01); *G06V 2201/032* (2022.01); *G06V 2201/07* (2022.01)

(58) Field of Classification Search
CPC ............. G06T 7/11; G06T 2207/10072; G06T 7/0012; G06T 2207/30096; G06V 10/25; G06V 10/778; G06V 10/454; G06V 10/26; G06V 2201/032; G06V 2201/07
See application file for complete search history.

(56) References Cited

U.S. PATENT DOCUMENTS

| | | | |
|---|---|---|---|
| 2021/0224603 A1* | 7/2021 | Yan ..................... | G06V 10/255 |
| 2021/0304403 A1* | 9/2021 | Harrison .............. | G06T 7/0012 |
| 2021/0326656 A1* | 10/2021 | Lee ...................... | G06F 18/217 |
| 2022/0335600 A1* | 10/2022 | Tang .................... | G06V 10/26 |
| 2024/0249409 A1* | 7/2024 | Mayer .................. | G06T 7/0012 |

OTHER PUBLICATIONS

Yan et al., "Universal Lesion Detection by Learning from Multiple Heterogeneously Labeled Datasets" (Year: 2020).*
Li et al., "Bounding Maps for Universal Lesion Detection" (Year: 2020).*
Li, Zihao et al., "MVP-Net: Multi-view FPN with Position-aware attention for Deep Universal Lesion Detection", Computer Vision and Pattern Recognition, Date: Dec. 2019, Publisher: Arxiv, https://arxiv.org/pdf/1909.04247.pdf.
Li, Han et al., "Bounding Maps for Universal Lesion Detection", Image and Video Processing, Date: Jul. 2020, Publisher: Arxiv, https://arxiv.org/pdf/2007.09383.pdf.
Kaluva, Krishna Chaitanya et al., "2D-Densely Connected Convolution Neural Networks for automatic Liver and Tumor Segmentation", Computer Vision and Pattern Recognition, Date: Jan. 2018, Publisher: Arxiv, https://arxiv.org/pdf/1802.02182.pdf.
Chaves, Levy et al., "An Evaluation of Self-Supervised Pre-Training for Skin-Lesion Analysis", Computer Vision and Pattern Recognition, Date: Jun. 2021, Publisher: Arxiv, https://arxiv.org/pdf/2106.09229.pdf.

* cited by examiner

200

202 — receiving and preprocessing a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI

204 — creating 3D context of the subRoI by defining a 3-channel input image based on each preprocessed slice of the slice set

206 — windowing each preprocessed slice of the slice set of the subRoI in accordance with a plurality of heuristically determined organ agnostic Hounsfield Unit (HU) windows with varying pixel intensities and highlighting varying organs, wherein a set of HU windowed images are created for each pre-processed slice

208 — generating a feature map block corresponding to each of the organ agnostic HU window by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window, wherein each of the feature map block corresponding to each of the organ agnostic HU window comprises a set of sub-level feature maps at a plurality of FPN levels, with each FPN level having receptive fields of different resolution to capture features of one or more lesions having varying sizes

A

FIG. 2A a) Per Lesion Size Sensitivity Comparison b) Per Organ Sensitivity Comparison a) Per Lesion Size Sensitivity Comparison b) Per Organ Sensitivity Comparison

METHOD AND SYSTEM FOR DOMAIN KNOWLEDGE AUGMENTED MULTI-HEAD ATTENTION BASED ROBUST UNIVERSAL LESION DETECTION

PRIORITY CLAIM

This U.S. patent application claims priority under 35 U.S.C. § 119 to: Indian Patent Application No. 202121050603, filed on 3 Nov. 2021. The entire contents of the aforementioned application are incorporated herein by reference.

TECHNICAL FIELD

The embodiments herein generally relate to field of lesion detection from medical images and, more particularly, to a method and system for domain knowledge augmented multi-head attention based robust universal lesion detection.

BACKGROUND

Advancements in deep learning techniques have led to significant breakthroughs in medical image analysis. In the past, efforts have been made to build automated lesion detection solutions that focus on specific organs such as liver, kidney, and lungs. However, to address the clinical necessity where radiologists are required to locate different types of lesions present in various organs of the body to diagnose patients and determine treatment, developing a universal lesion detection (ULD) model has become an active area of research. Tang et. al proposed ULDor based on Mask-Region-based Convolutional Neural Network (RCNN) for lesion detection and a hard negative mining (HNEM) strategy to reduce false positives. However, the proposed HNEM technique may not enhance detection performance due to missing annotations as the mined negatives may actually contain positives. Other RCNN based ULD networks that use weights pre-trained on ImageNet for detection. There also exist attention-based ULD networks where attention has been shown to improve the lesion detection by enabling the network to focus on important regions of CT-scans. MVP-Net proposed to use a position-aware attention module to aggregate features from a multi-view feature pyramid network. Another work on ULD by Wang et al., proposed volumetric attention which exploits 3-Dimensional (3D)-context from multi-slice image inputs and a 2.5 D network for improving the detection performance. The multi-task universal lesion analysis network (MULAN) utilizes 27 slices as input and proposes a 3D feature fusion strategy with Mask-RCNN backbone for lesion detection. In addition, they jointly train the network to perform lesion segmentation and tagging.

Typically, deep networks are reliant on high-volume datasets for automatically discovering relevant features for a learning task. However, due to the very similar appearance of lesions and other internal structures in CT scans, lesion detection is quite a challenging problem. Yan et al. proposed a Lesion ENSemble (LENS) network for lesion detection that can efficiently learn from heterogeneous lesion datasets and address the issue of missing annotations by exploiting clinical prior knowledge and cross-dataset knowledge transfer. In another work, authors have proposed a MELD network for lesion detection which learns from multiple heterogeneous diverse datasets and uses missing annotation matching (MAM) and negative region mining (NRM) for achieving state-of-the-art lesion detection performance on DeepLesion dataset. In summary, previous works on ULD have made use of 3D-context in the form of multi-slice inputs, incorporation of attention mechanisms, multi-task learning, hard negative mining techniques, and multiple heterogeneous datasets to enhance the lesion detection sensitivity performance. It is understood that, with current state of the art deep networks based ULD approaches, input dataset size requirement is high for accurate analysis. Methods used in prior arts to aggregate the extracted multi-view or multi-slices information do not utilize the local and global context of multiple organs all together. This in turn affects the time, computation, and power efficiency of existing ULD systems.

SUMMARY

Embodiments of the present disclosure present technological improvements as solutions to one or more of the above-mentioned technical problems recognized by the inventors in conventional systems.

For example, in one embodiment, a method for domain knowledge augmented multi-head attention based robust universal lesion detection is provided. The method receives and preprocesses a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI.

Further the method creates a 3-Dimensional (3D) context of the subRoI by defining a 3-channel input image based on each preprocessed slice of the slice set;

Further the method windows using windowing technique each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each pre-processed slice.

Further the method generates a feature map block corresponding to each of the organ agnostic HU window by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window. Each feature map block corresponding to each of the organ agnostic HU window comprises a set of sub-level feature maps at a plurality of FPN levels, with each FPN level having receptive fields a different resolution to capture features of one or more lesions having varying sizes.

Further the method generates a fused feature map block (F') using a convolution augmented attention module that applies feature fusion on the feature map block corresponding to each of the organ agnostic HU window, wherein the convolution augmented attention module: i) concatenates the set of sub-level feature maps of the feature map block for each of the organ agnostic HU window to obtain a concatenated multi-view feature map block, ii) utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory, iii) convolutes down each of the sub-level feature maps to a lower dimension using the multi-headed self-attention module to provide a compressed channel information, and iv) utilizes the compressed channel information to generate Key, Query and Value matrix to match a predefined number of output channels, wherein outputs from the learnable 2D convolution layer and the multi-headed self-attention module are concatenated.

Furthermore the method predicts one or more lesions of varying sizes in the preprocessed slice set by analyzing the fused feature map block (F') using a Region proposal Network (RPN), wherein the RPN generates bounding boxes and corresponding probability values across the one or more lesions of varying sizes from amongst a set of customized lesion specific anchors sizes.

Furthermore, the method trains the shared feature extractor using a self-supervised learning (SSL) technique that applies medical domain specific weights during training for accurate extraction of lesions with varying sizes.

In another aspect, a system for domain knowledge augmented multi-head attention based robust universal lesion detection is provided. The system comprises a memory storing instructions; one or more Input/Output (I/O) interfaces; and one or more hardware processors coupled to the memory via the one or more I/O interfaces, wherein the one or more hardware processors are configured by the instructions to receive and preprocess a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI.

Further the system creates a 3-Dimensional (3D) context of the subRoI by defining a 3-channel input image based on each preprocessed slice of the slice set;

Further the system windows, using a windowing technique, each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each preprocessed slice.

Further the system generates a feature map block corresponding to each of the organ agnostic HU window by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window. Each feature map block corresponding to each of the organ agnostic HU window comprises a set of sub-level feature maps at a plurality of FPN levels, with each FPN level having receptive fields a different resolution to capture features of one or more lesions having varying sizes.

Further the system generates a fused feature map block (F') using a convolution augmented attention module that applies feature fusion on the feature map block corresponding to each of the organ agnostic HU window, wherein the convolution augmented attention module: i) concatenates the set of sub-level feature maps of the feature map block for each of the organ agnostic HU window to obtain a concatenated multi-view feature map block, ii) utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory, iii) convolutes down each of the sub-level feature maps to a lower dimension using the multi-headed self-attention module to provide a compressed channel information, and iv) utilizes the compressed channel information to generate Key, Query and Value matrix to match a predefined number of output channels, wherein outputs from the learnable 2D convolution layer and the multi-headed self-attention module are concatenated.

Furthermore, the system predicts one or more lesions of varying sizes in the preprocessed slice set by analyzing the fused feature map block (F') using a Region proposal Network (RPN), wherein the RPN generates bounding boxes and corresponding probability values across the one or more lesions of varying sizes from amongst a set of customized lesion specific anchors sizes.

Furthermore, the system trains the shared feature extractor using a self-supervised learning (SSL) technique that applies medical domain specific weights during training for accurate extraction of lesions with varying sizes.

In yet another aspect, there are provided one or more non-transitory machine-readable information storage mediums comprising one or more instructions, which when executed by one or more hardware processors causes a method for domain knowledge augmented multi-head attention based robust universal lesion detection.

The method receives and preprocesses a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI.

Further the method creates a 3-Dimensional (3D) context of the subRoI by defining a 3-channel input image based on each preprocessed slice of the slice set;

Further the method windows, using a windowing technique, each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each pre-processed slice.

Further the method generates a feature map block corresponding to each of the organ agnostic HU window by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window. Each feature map block corresponding to each of the organ agnostic HU window comprises a set of sub-level feature maps at a plurality of FPN levels, with each FPN level having receptive fields a different resolution to capture features of one or more lesions having varying sizes.

Further the method generates a fused feature map block (F') using a convolution augmented attention module that applies feature fusion on the feature map block corresponding to each of the organ agnostic HU window, wherein the convolution augmented attention module: i) concatenates the set of sub-level feature maps of the feature map block for each of the organ agnostic HU window to obtain a concatenated multi-view feature map block, ii) utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory, iii) convolutes down each of the sub-level feature maps to a lower dimension using the multi-headed self-attention module to provide a compressed channel information, and iv) utilizes the compressed channel information to generate Key, Query and Value matrix to match a predefined number of output channels, wherein outputs from the learnable 2D convolution layer and the multi-headed self-attention module are concatenated.

Furthermore, the method predicts one or more lesions of varying sizes in the preprocessed slice set by analyzing the fused feature map block (F') using a Region proposal Network (RPN), wherein the RPN generates bounding boxes and corresponding probability values across the one or more lesions of varying sizes from amongst a set of customized lesion specific anchors sizes.

Furthermore, the method trains the shared feature extractor using a self-supervised learning (SSL) technique that applies medical domain specific weights during training for accurate extraction of lesions with varying sizes. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B (collectively referred as FIG. 2) is a flow diagram illustrating a method for domain knowledge augmented multi-head attention based robust universal lesion detection, using the system of FIG. 1, in accordance with some embodiments of the present disclosure.

Figure 1A:
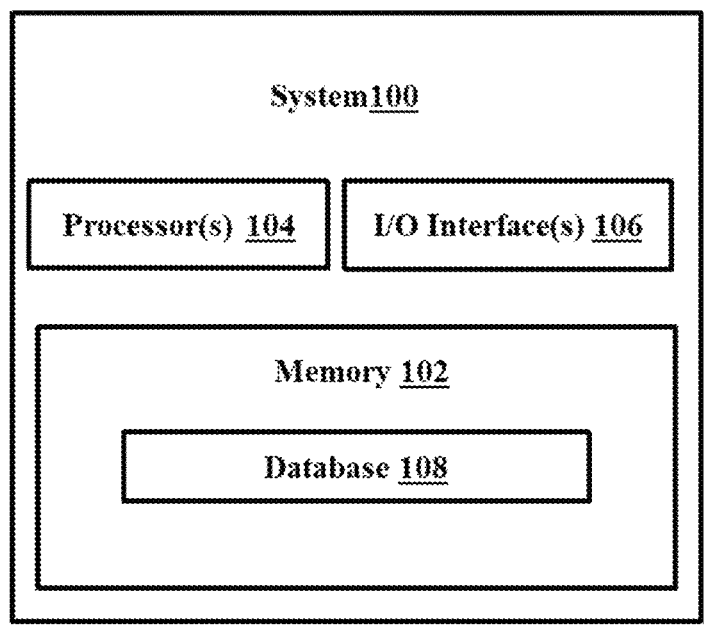
FIG. 1A is a functional block diagram of a system, for domain knowledge augmented multi-head attention based robust universal lesion detection, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The state of the art deep network based Universal Lesion Detection (ULD) techniques inherently depend on large number of datasets for training the systems. Moreover, these system are specifically trained for lesion detection in organs of a body part of interest, also referred to as subject's Region of Interest (subRoI). Thus, requires retraining when the subRoI varies. Further, the state of the art approaches utilize a variety of heterogeneous datasets to learn robust representations for the ULD. Embodiments herein disclose a method for universal lesion detection. The method utilizes minimal number of Computer Tomography (CT) scan slices to extract maximum information using organ agnostic HU windows using domain knowledge associated with CT-scans and a convolution augmented attention module for a computationally efficient ULD with enhanced prediction performance providing increased accuracy for automated lesion detection.

Referring now to the drawings, and more particularly to FIGS. 1 through 6D, where similar reference characters denote corresponding features consistently throughout the figures, there are shown preferred embodiments and these embodiments are described in the context of the following exemplary system and/or method.

FIG. 1A is a functional block diagram of a system 100, for domain knowledge augmented multi-head attention based robust universal lesion detection, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 1B:
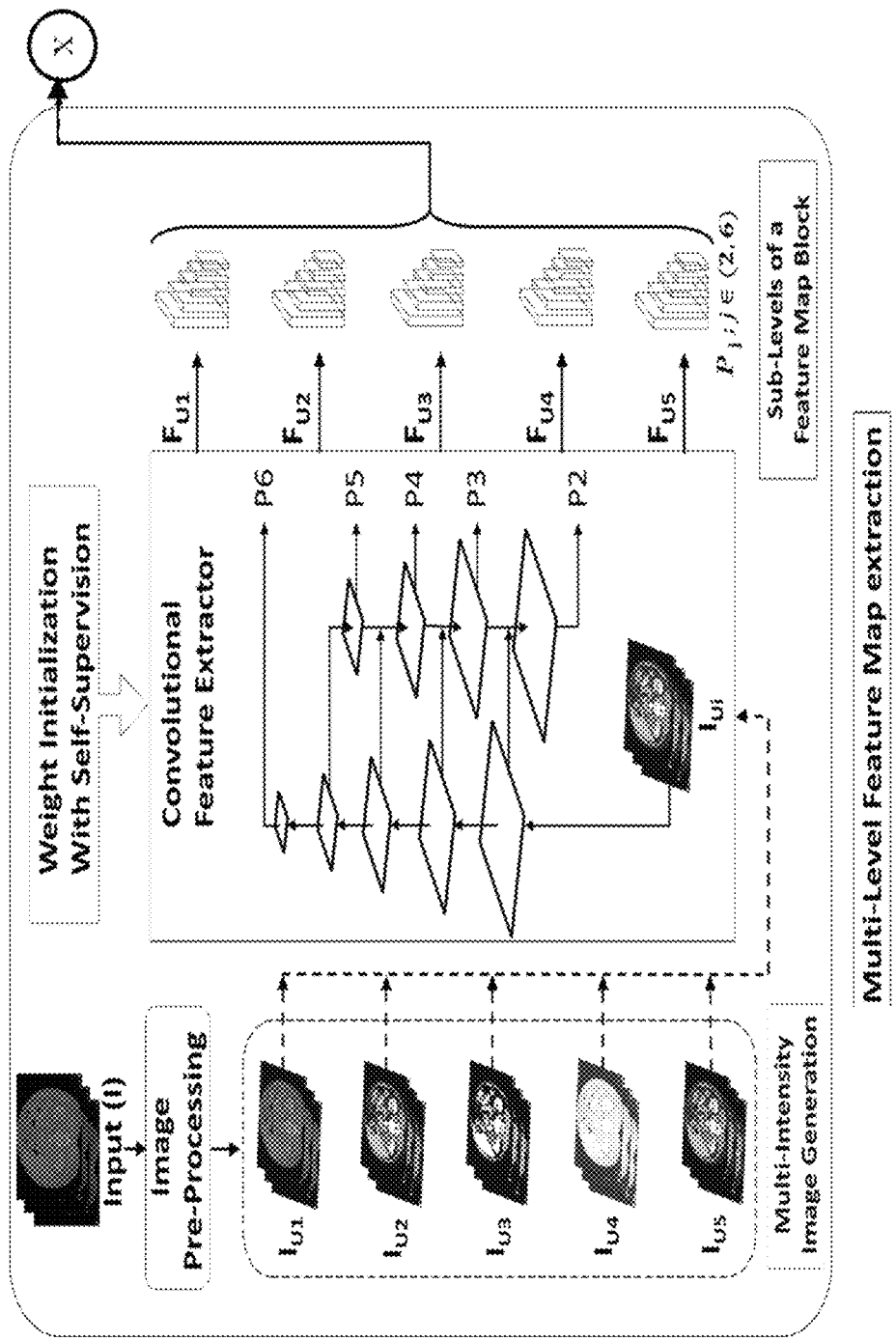
FIGS. 1B, 1C and 1D illustrate an architectural overview of the system of FIG. 1A, in accordance with some embodiments of the present disclosure.
Figure 1C:
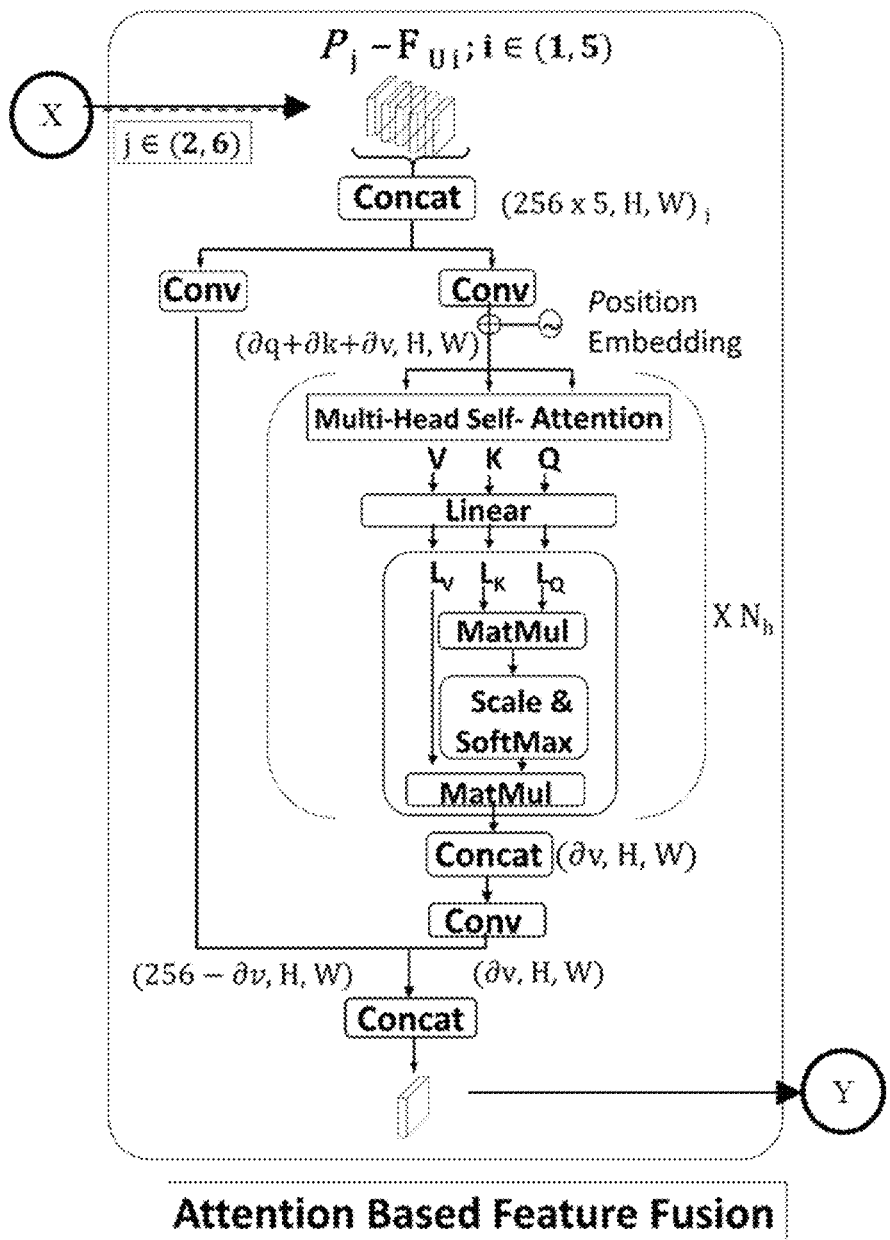
Figure 1D:
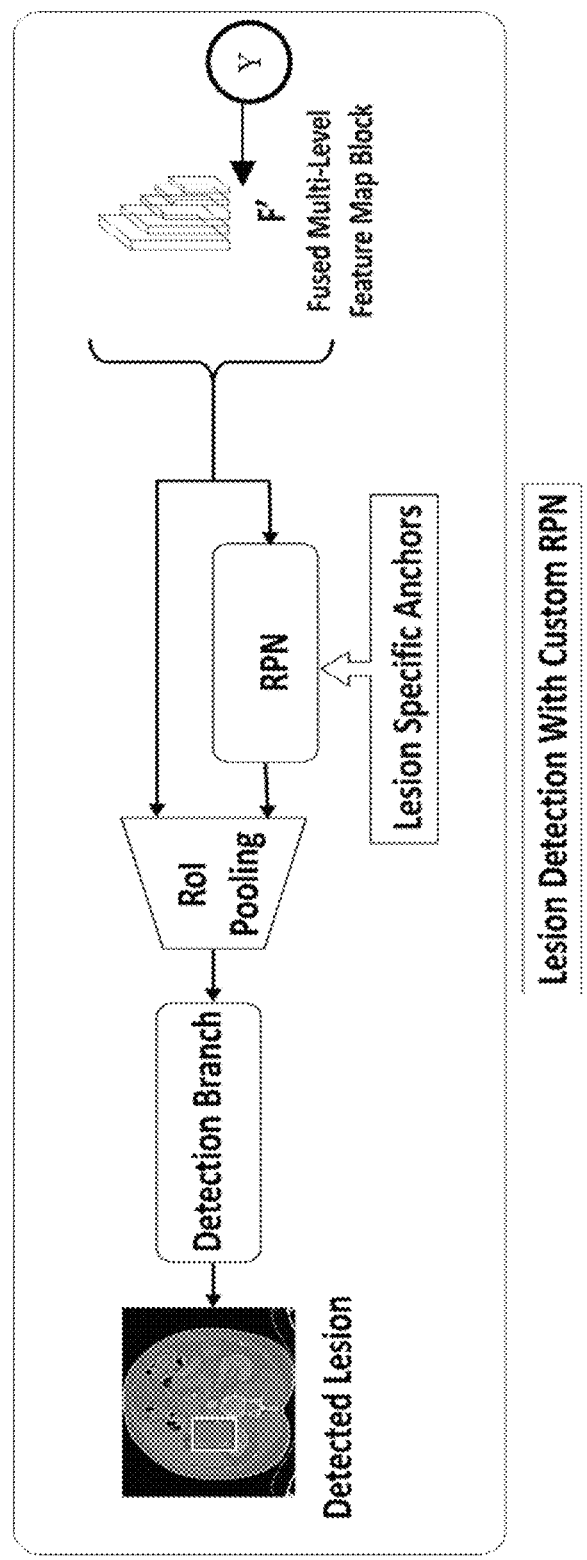

Further, the memory 102 includes modules (not shown) for (a) multi-level feature map extraction, (b) attention based feature fusion, (c) lesion detection with custom RPN as depicted in FIGS. 1B, 1C and 1D respectively that enable domain knowledge augmented multi-head attention based robust universal lesion detection. Further, the memory 102 may comprise information pertaining to input(s)/output(s) of each step performed by the processor(s) 104 of the system 100 and methods of the present disclosure. Further, the memory 102 includes a database 108 that stores the CT scan slices received for lesion detection, and the like. In an embodiment, the database 108 may be external (not shown) to the system 100 and coupled to the system via the I/O interface 106. Functions of the components of the system 100 are explained in conjunction with architecture of the system as depicted in FIGS. 1B through 1D and steps of flow diagram of FIG. 2.

FIGS. 1B, 1C and 1D illustrate the architectural overview of the system 100 of FIG. 1A, in accordance with some embodiments of the present disclosure.

The system 100, interchangeably referred to as Domain-knowledge augmented multi-attention based universal lesion detection (DKMA-ULD) framework, extracts as many domain-specific features as possible from minimal number of Computer Tomography (CT) scan slices for a particular patient or subject, to provide a robust, computation and resource efficient ULD with enhanced prediction performance or accuracy in prediction of lesion. The system 100 utilizes lesser training data as compared to state of the art approaches, hence requires lesser storage or memory space. The system 100 utilizes minimum slices from CT scan of a patient and extracts maximum information using the disclosed architecture of the DKMA-ULD framework that enables incorporating 3-Dimensional (3D) context of input data to the system for further processing. The information of tissue density from CT-scans represented as Hounsfield Unit (HU)-values in terms of window width and window length. During manual analysis, radiologists adjust these windows to focus on organs/tissues of interest in a subject's Region of interest (subRoI), interchangeably referred as body part of interest such as abdomen, chest, or the like. The method and system disclosed herein, in an example implementation utilizes 5 heuristically determined HU windows for CT-slices and feed them as multi-intensity input to the detection network to make it organ-agnostic. Further, the computed features are combined using a convolution augmented multi-head attention-based fusion architecture. Further, transformers based self-attention mechanism for feature-fusion of multi-intensity images that effectively combines multi-organ information efficiently. This is analogous to the radiologists' way of paying attention to different organs at different HU windows of CT scan slices simultaneously while detecting lesions. Further, since default anchor sizes and ratios used in general object detection networks do not perform satisfactorily for lesions of different sizes, particularly for very small (<10 mm) and medium-sized (10-30 mm) lesions, the system generates customized anchor sizes and ratios for a Region Proposal Network (RPN) that enable detecting lesions of varied sizes mostly found in medical imaging datasets. Furthermore, self-supervised learning (SSL) techniques are applied for efficient learning of weights of the backbone network of the DKMA-ULD framework.

Figure 2B:
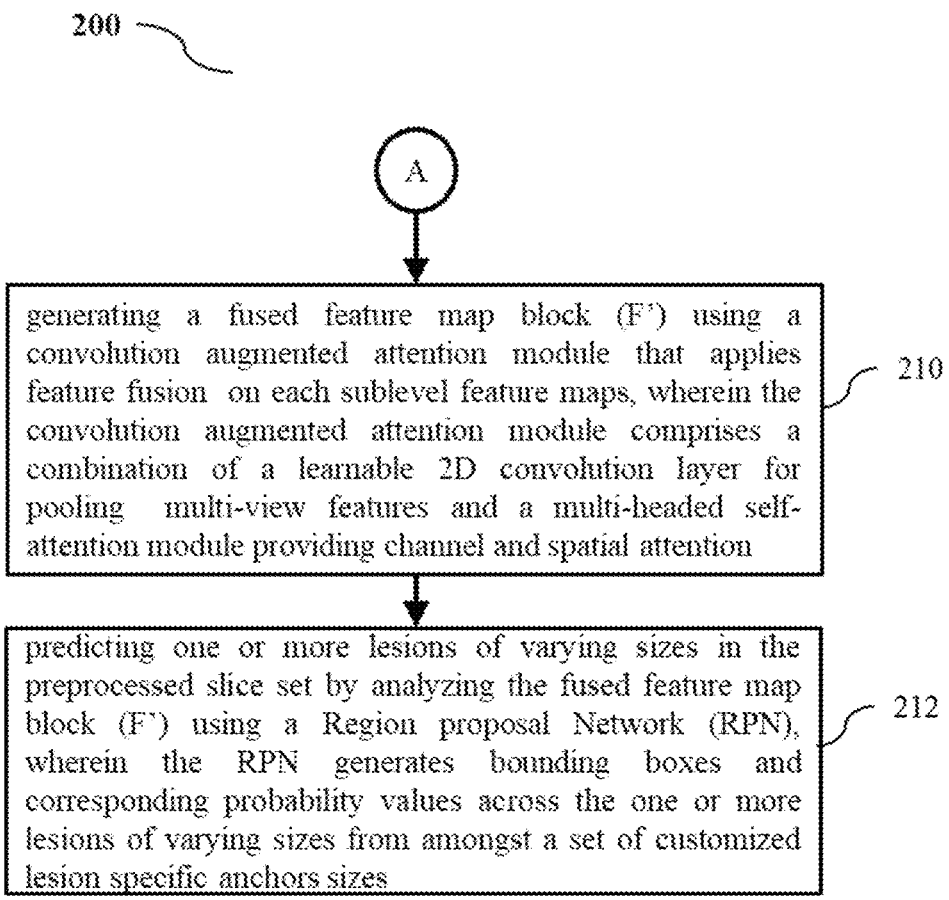

FIGS. 2A and 2B (collectively referred as FIG. 2) is a flow diagram illustrating a method 200 for domain knowledge augmented multi-head attention based robust universal lesion detection, using the system 100 of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A through 1D and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 receive and preprocess a slice set, from amongst a plurality of slices of the Computed Tomography (CT) scan of a subject. The slice set comprises i) a key slice of a subject's Region of Interest (subRoI) and ii) a superior slice and an inferior slice in neighborhood of the key slice of the subRoI. For a given CT volume the slice which has largest cross-section for lesion is marked as key slice, also refereed as representative lesion. For a given patient volume, key slice number is provided as a meta data. An example slice set is provided later at step 206.

Typically, clinicians observe multiple adjacent slices of a patient's CT scan to confirm the diagnosis of a pathology. During training/learning and evaluation phase largest publicly available repository 'DeepLesion' of CT-slices with annotated lesions across different organs of the body released by the National Institutes of Health (NIH) is used. It consists of data from 4,427 unique patients based on markings performed by radiologists during their routine work. There are approximately 32,120 axial CT slices from 10,594 CT studies of the patients having around 1-3 lesions annotated per CT-scan. The lesions in each image have annotations such as bounding-box coordinates and size measurements, etc. which add up to 32,735 lesions altogether from eight different body organs including bone, abdomen, mediastinum, liver, lung, kidney, soft-tissue, and pelvis. The CT scan slices obtained from the dataset may be stored in the database 108. However, when the system 100 is used for real time or practical application, CT scan slices obtained for a subject or patient, via the I/O interface 106, in real time are analyzed for predicting and locating lesions in the CT scans of the patient. As depicted in FIG. 1B, preprocessing includes, first resampling CT volume to a common voxel resolution of 0.8×0.8×2 mm³ followed by the removal of black borders of the CT-slices for computational efficiency and to focus on area of interest. Next, normalization and clipping is performed on the 12-bit intensity values of a CT slice using a HU window and then intensity values are re-scaled to floating-point values in the range [0.0; =, 255.0]. Further, since the 'DeepLesion' dataset does not have segmentation masks for the lesions, pseudo masks are generated using provided RECIST diameter measurements in the art. These pseudo masks boost the performance of Mask-RCNN by adding a branch for predicting segmentation masks on region proposals generated by RPN. Furthermore, the data is augmented during training using random affine transformations such as horizontal and vertical flips, resizing with a ratio of 0.8 to 1.2, and translation of (−8,8) pixels in x and y direction.

At step 204 of the method 200, the one or more hardware processors 104 create a 3D context of the subRoI by defining a 3-channel input image based on each preprocessed slice of the slice set. In order to provide 3D context of a patient's CT-scan to the network, as mentioned 3 slices (key slice with one superior and one inferior neighboring slice are utilized to generate 3-channel input image (I), as depicted in FIG. 1B. Meta-data is provided with dataset to decide which slice number is to be considered as a key slice. For neighbor slices, one slice present 2 mm above and another slice present 2 mm below the key slice are selected.

Figure 3A:
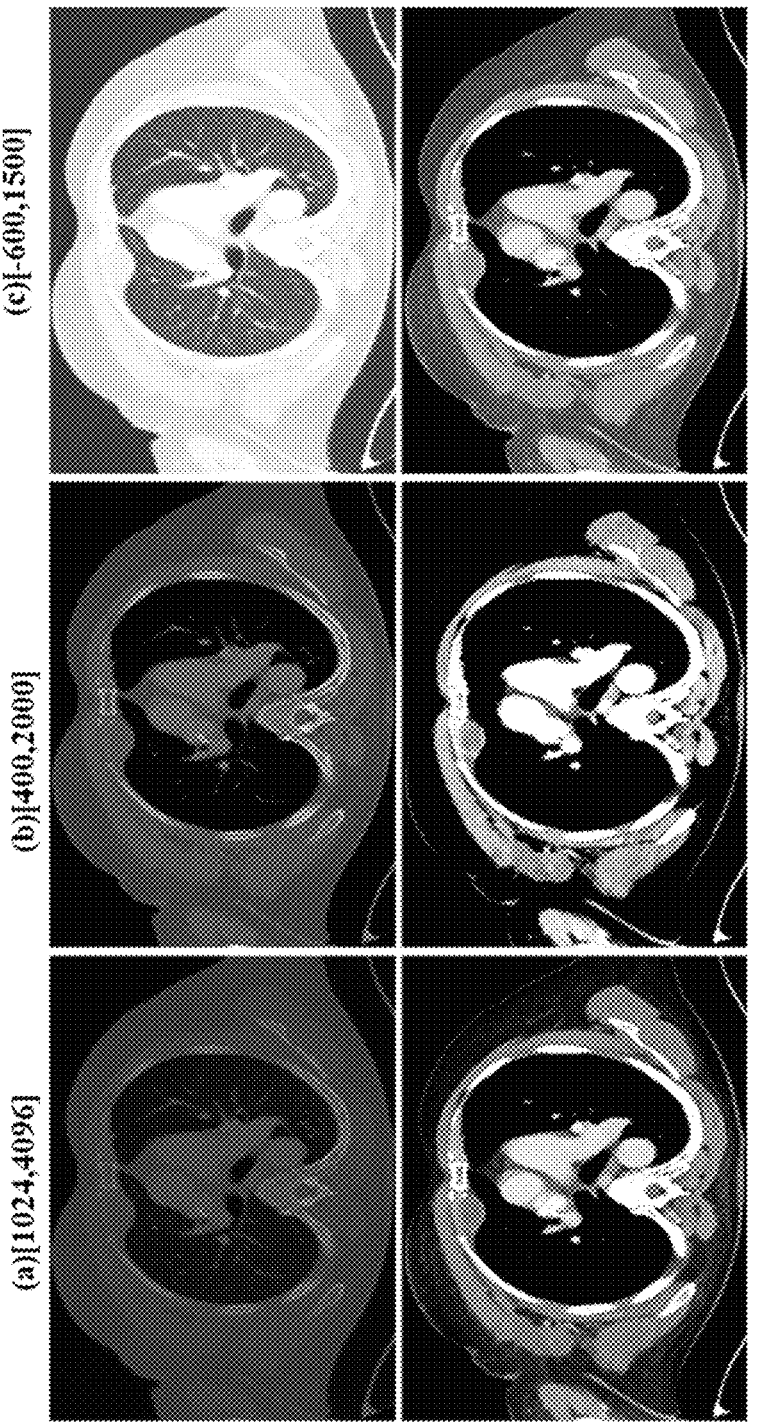
FIGS. 3A, 3B and 3C (collectively referred as FIG. 3) are example slices of Computer Tomography (CT) scans with a standard Hounsfield Unit (HU) window, and a plurality of organ agnostic HU windows used by the system of FIG. 1 for domain knowledge augmented multi-head attention based robust universal lesion detection, in accordance with some embodiments of the present disclosure.

At step 206 of the method 200, the one or more hardware processors 104 window, using a widowing method known in art, each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each preprocessed slice. Thus, at step 206 multiple intensity image generation takes place. As depicted in FIG. 1B. In general, the intensity of a CT-slice is rescaled using a certain HU window, U (e.g., a single and wide window of [1024, 4096], as used by prior approaches), in order to include gray-scale intensities of different organs. However, using a single window suppresses organ-specific information resulting into a degenerated image-contrast, as shown in FIG. 3A (a), 3B (a) and 3C (a) which in turn makes it hard for the system 100 to learn to focus on various organs present in the given CT volume. During manual detection of lesions, radiologists adjust these intensity values to focus on organs/tissue of interest. Thus, the method 200 disclosed herein exploit this domain knowledge and feeds it to a deep network, comprising the shared feature extractor, the attention network and the region proposal network (RPN), explicitly in the form of CT-slices having multiple intensities which highlight different organs of the body or the subjects's RoI (subRoI). In an attempt to utilize multiple HU windows, 'MVP-Net: Multi-view FPN with Position-aware attention for Deep Universal Lesion Detection' by Zihao Li et al., utilizes a clustering algorithm to determine three HU windows. However, the method disclosed herein utilizes a set of 5 organ agnostic HU windows, interchangeably referred as HU windows, by utilizing domain knowledge, to capture or cover multi-organ information in input CT-slices. Further even though, '2D-Densely Connected Convolution Neural Networks for automatic Liver and Tumor Segmentation' by Krishna Chaitanya Kaluva et. al refers using multiple HU windows, the lesion detection in the literature work is specific to liver and is an organ specific lesion detection method. The 5 HU windows identified by the method disclosed are based on domain knowledge which makes them more generic, data independent and unsupervised. Hence, they need not be computed each time pipeline runs on a new dataset, which reduces overall time complexity of the DKMA-ULD framework. The given eight organs are divided into different body parts and based on that corresponding HU windows are selected. The respective body parts are bones, chest region including lungs and mediastinum, abdomen including liver and kidney, and soft-tissues. However, it can be understood that number of windows are flexible and can be increased in accordance with additional body parts that the system 100 is expected to analyze. The HU widows are determined in such a way that the major body organs are covered. The HU windows, which cover almost all organs of interest for radiologists are: $U_1$=[400,2000], $U_{2,3}$=[−600,1500], [50, 350], $U_4$=[30,150], $U_5$=[50,400] for bones, chest region including lungs and mediastinum, abdomen including liver and kidney, and soft-tissues, respectively. For a $U=[U_l,U_w]$, where, $U_l$ and $U_w$ are the window level/center and window width, the intensity values of a CT-slice are first normalized using $(U_l \pm U_w/2)$ as data min/max and clipped between [0,1] and then, re-scaled to values in [0,255].

Figure 3B:
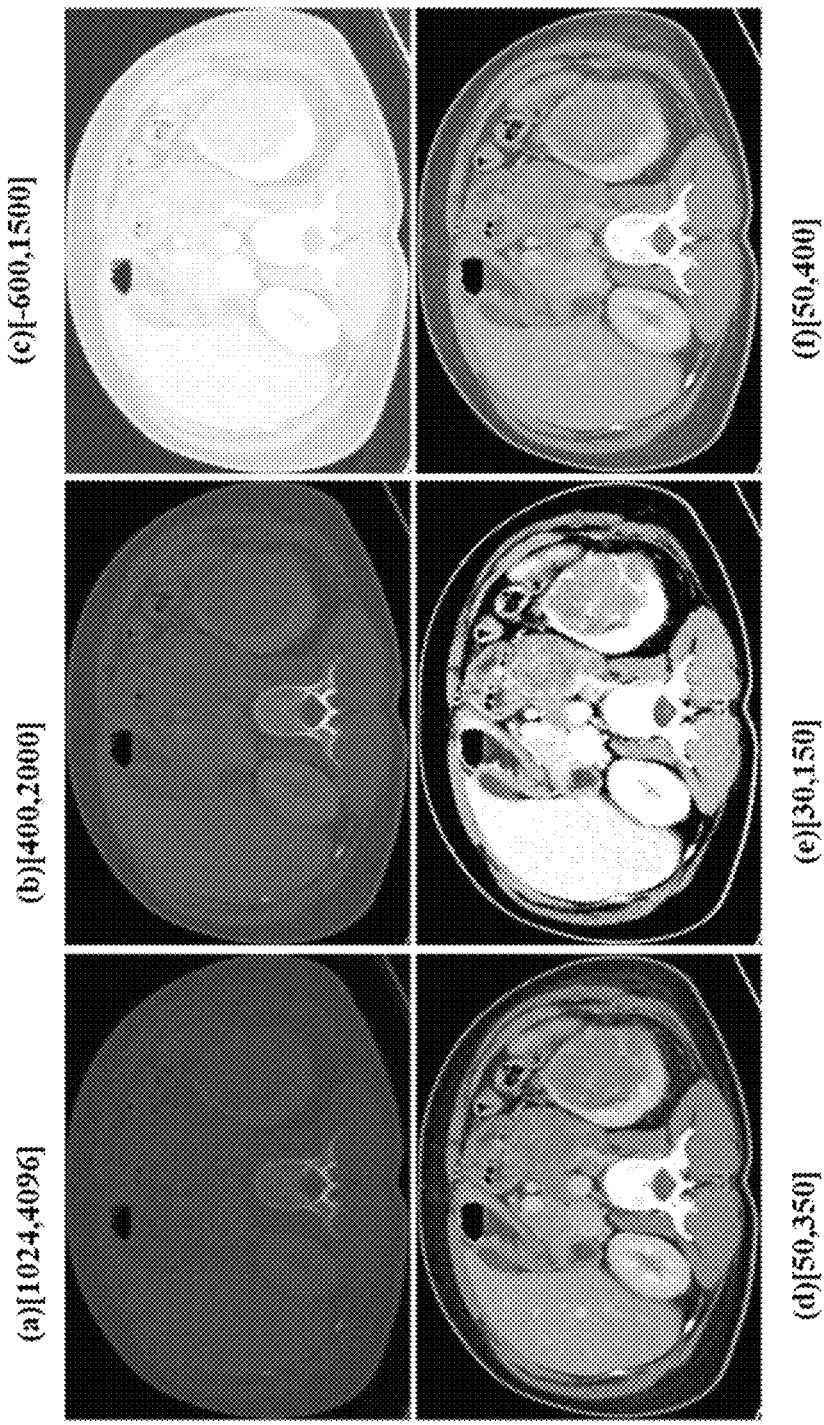
Figure 3C:
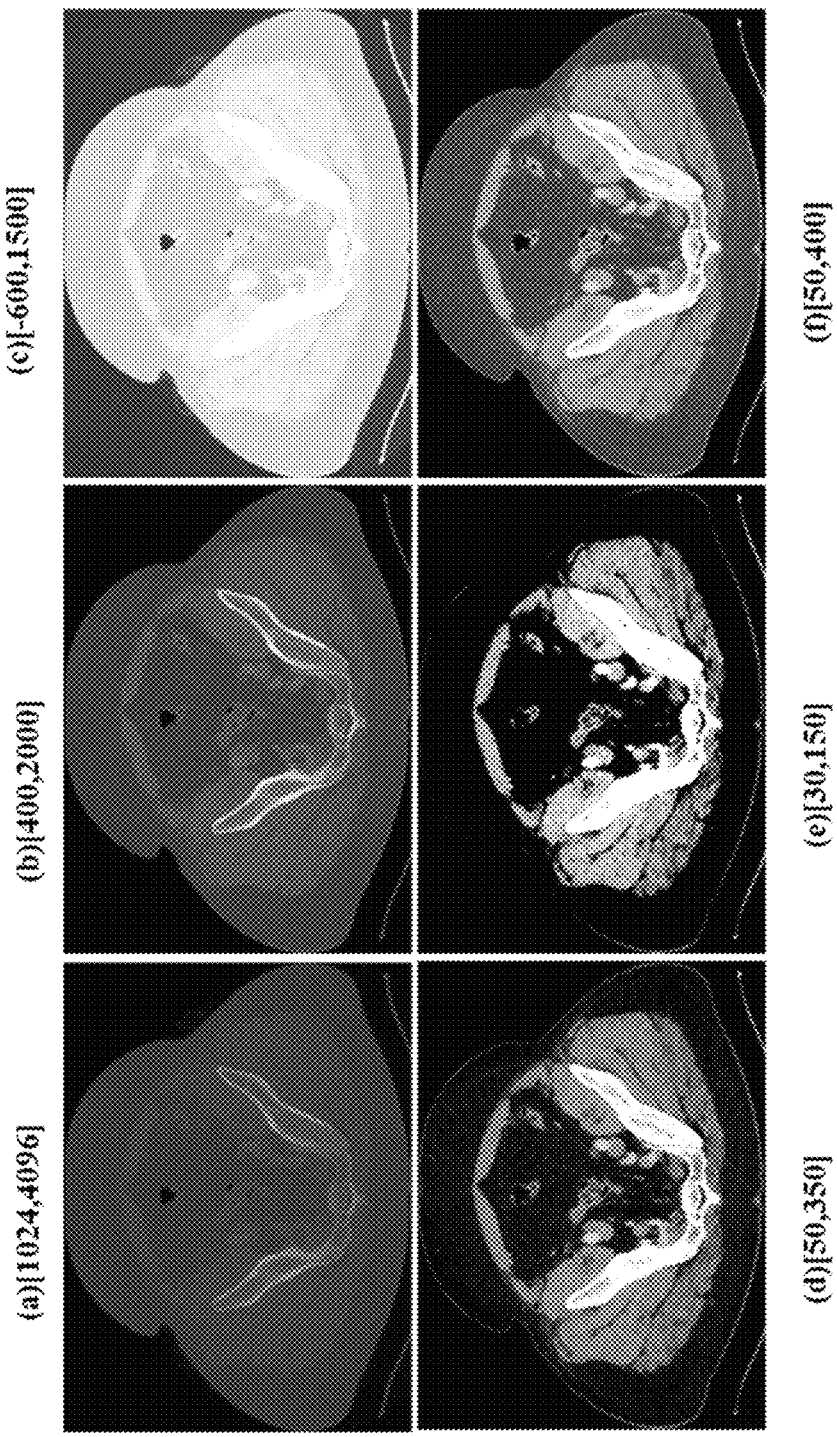
Figure 4:
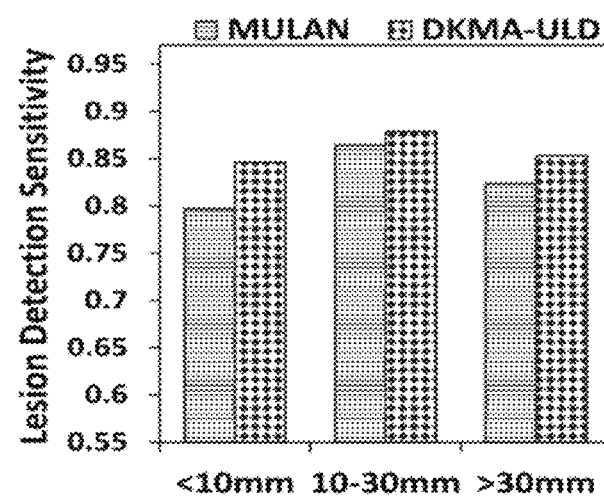
FIG. 4 depicts average sensitivity comparison of the system against state-of-the-art techniques for different lesion sizes and organs of a region of interest, in accordance with some embodiments of the present disclosure.
Figure 4:
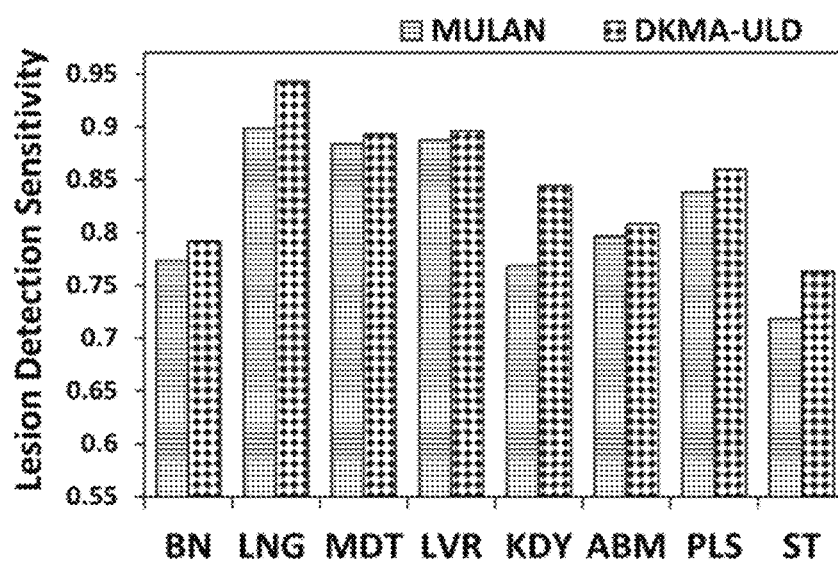

FIGS. 3A, 3B and 3C depicts CT-slices of chest-region, abdomen-region, and pelvic-region, respectively. The column (a) illustrates images with commonly used HU window (U=[1024,4096]) while columns ranging from (b) to (f) have images with the new 5 HU windows. The FIGS. 3A to 3C clearly demonstrates that by using a greater number of windows, different organs of a particular body-region present in a CT volume, can be highlighted more efficiently.

At step 208 of the method 200, the one or more hardware processors 104 generate a feature map block corresponding to each of the organ agnostic HU window by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window. Each feature map block corresponding to each of the organ agnostic HU window comprises a set of sub-level feature maps at a plurality of FPN levels, with each FPN level having receptive fields of different resolution to capture features of one or more lesions having varying sizes. Convolution Feature Extraction Backbone for multilevel feature map extraction: As depicted in FIG. 1B, for a given patient or subject, 5 multiple intensity images each having 3 slices/channels, are passed as input to the ResNeXt-152 shared backbone with feature pyramid network (FPN) based convolutional feature extractor. The fact that applying pooling layers of CNN repeatedly on an image can filter out information of small objects due to down sampling, hence, resulting in missing small and medium-sized lesions in radiological scans. Therefore, the method 200 utilizes FPN where shallow and deeper feature maps are more suitable for detecting small/medium and larger lesions, respectively. As a result, for a given input obtained are, 5 feature-map blocks ($F_{Ui}$) corresponding to 5 FPN levels, each having 5 feature map sub-levels (Pj) of dimension (256, H,W)$_i$, where H and W represent height and width of the feature map and j=2, ..., 6 are the pyramid-levels. These extracted feature maps at different FPN levels, each having a different resolution allows the RPN to effectively focus on lesions of different sizes.

At step 210 of the method 200, the one or more hardware processors 104 generate a fused feature map block (F') using a convolution augmented attention module that applies feature fusion on the feature map block corresponding to each of the organ agnostic HU window. For feature fusion, feature maps extracted from different windowed images are concatenated along channels. Aim of the feature fusion is to bring down the number of concatenated channels to a fixed lower value. A simple convolution layer, as used in state-of-the-art approaches, can also be used for the feature fusion but convolution layers operate only on a local neighborhood, so to increase the fusion efficiency the method 200 uses a self-attention approach, which captures global information across long range dependencies. Number of output channels of a self-attention module are governed by its Value matrix. Directly using the self-attention module to fuse multiple feature maps will result in a higher Value matrix dimension and that would result in a computational overload and also restricts its usage for feature fusion at high resolution pyramid levels. To reduce the computational burden a convolution layer is augmented in parallel to self-attention module, and number of output channels are divided between these two branches based on allowed computational memory. In self-attention branch first, channels from multiple feature maps are convoluted down to a lower dimension. This compressed channel information is then used to generate Key, Query and Value matrix and then multi-headed self-attention module is applied. To match the desired output number of channels, outputs from two parallel branches are concatenated. This optimization allows the method 200 to readily apply feature fusion module on different pyramid level with different resolutions, which in-turn helps to detect lesions of different sizes.

Thus, the convolution augmented attention module performs following functions:
i) Concatenates the set of sub-level feature maps of the feature map block for each of the organ agnostic HU window to obtain a concatenated multi-multi-view feature map block.
ii) Utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory,
iii) Convolutes down each of the concatenated multi-view feature map block to a lower channel dimension using the multi-headed self-attention module to provide a compressed channel information, and
iv) Utilizes the compressed channel information to generate Key, Query and Value matrix to match a predefined number of output channels, wherein outputs from the learnable 2D convolution layer and the multi-headed self-attention module are concatenated.

The architecture of the convolution augmented multi-head attention module for attention based feature fusion is depicted in FIG. 1C. State of the art ULD techniques such as MULAN incorporated information from multiple slices in their network by fusing the feature maps of all 3-channel images/slices with a convolution layer to obtain a 3D-context-enhanced feature map for the central slice. The method disclosed utilizes self-attention technique and use of the multi-head self-attention enables the feature fusion module to attend jointly to both spatial and feature sub-spaces. As shown in FIG. 1C, first 5 multi-view feature maps (256, H,W)j for a specific sub-level are concatenated to obtain feature-vectors of shape (256×5, H,W)$_i$. These features are, subsequently, passed to two parallel branches namely, the 2D convolution layer and transformer's multi-head self-attention. Finally, their outputs are fused using concatenation. Since the output depth of the attention module is dependent on the depth of its "values" matrix (dv), the output depth of 2D convolution branch is kept such that the depth of the final feature vector obtained after concatenation of both the outputs is 256. Similar attention-based feature fusion is used at all 5 feature-map sub-levels and finally, a fused feature map block, F', with 5 feature-maps sub-levels is obtained for later processing. To minimize computation overhead for attention, 2 attention heads ($N_h$) are used and the depth of values matrix is used as 4. In addition, 20 dimensions per head for key and query matrix are used.

At step 212 of the method 200, the one or more hardware processors 104 predict one or more lesions of varying sizes in the preprocessed slice set by analyzing the fused feature map block (F') using a Region proposal Network (RPN). The RPN generates bounding boxes and corresponding probability values across the one or more lesions of varying sizes from amongst a set of customized lesion specific anchors sizes. As depicted in FIG. 1D, lesion-specific anchors are used for extracting Regions of Interest (ROI) from the obtained feature maps from 5 FPN levels, anchor boxes play a very crucial role. It is observed that small lesions are hard to detect using default anchor sizes and ratios used in RPN for real-world object detection. To circumvent this, the method 200 creates new custom anchors, which are well suited for detecting lesions of all sizes in CT scans. If, H and W are the image height and width, respectively, anchor boxes of different sizes centered on each image pixel are generated, such that it has maximum Intersection over Union (IoU) with lesion bounding box. If anchor sizes and ratios are in sets $\{s,s_2, \ldots s_n\}$ and $\{r_1 \, r_2, \ldots, r_m\}$, respectively for each r>0, there can be a total of WH(n+m−1) anchor boxes. Consider $w_b$ and $h_b$ to be the width and height of anchor boxes, then $$[w_b, h_b] = [W_{s_n}\sqrt{r_m}, H_{s_n}/\sqrt{r_m}] s.t. n,m \in [1,5] \tag{1}$$

A differential evolution search algorithm known in the art is used to find, for example 5 best anchor sizes, [16,24,64,128,256] and ratios [3.27,1.78,1,0:56,0.30] for P2,P3,P4,P5, and P6 feature map sub-levels, respectively. These lesion-specific anchors are used in RPN for RoI extraction, which are combined with feature maps using RoI pooling layer and further used, for predicting bounding-boxes around lesions along with probability values, as shown in FIG. 1D. The custom anchors allow covering varied sized lesions and more specifically, improve the detection of small-sized (<10 mm) and medium-sized (10-30 mm) lesions considerably, as evident in graphical analysis of FIG. 4(a).

Self-supervision: The idea behind self-supervised learning (SSL) is that the learned intermediate representations can carry better semantic and structural meanings and can prove to be beneficial for a variety of downstream tasks. In order to make our DKMA-ULD more robust, a state-of-the-art SSL technique called Bootstrap your own latent (BYOL) is used. It relies on two neural networks, referred to as online and target networks, that interact and learn from each other. The target network (parameterized by ξ) has the same architecture as the online one (parameterized by θ), but with polyak averaged weights, ξ←τξ++(1−τ)θ. The goal is to learn a representation y that can be used in downstream tasks. Generally, the detection networks are initialized using weights pre-trained on imagenet consisting of natural images and may not be effective for the medical imaging domain. Therefore, the domain-specific weights, obtained by training the backbone using SSL over train-split (23K images) of the DeepLesion dataset, for initializing DKMA-ULD are used to obtain enhanced performance.

Experimental Results and Discussions: Official data split of DeepLesion dataset, which consists of 70%, 15%, 15% for training, validation, and test, respectively is used. The DeepLesion test-set includes only key CT-slices and may contain missing annotations. The lesion detection is classified as true positive (TP) when the IoU between the predicted and the ground-truth bounding-box is larger than 0.5. The average sensitivity is reported for, computed at 0.5, 1, 2, and 4 false-positives (FP) per image, as the evaluation metric on the standard test-set split for the fair comparison.

Further, training of the DKMA-ULD framework is performed on 3 channel CT images of size 512×512 with a batch size of 4 on a single NVIDIA Tesla V100 having 32 GB GPU-memory. A cross-entropy and smooth $l_1$ loss for classification and bounding-box regression is used, respectively. The system 100 is trained until convergence using SGD optimizer with a learning rate (LR) and decay-factor of 0.02 and 10, respectively. The SSL model is trained using cross-entropy loss with a batch size of 64, as provided by Adam optimizer, and LR of 3e-4 for 300 epochs.

Results and Discussions: The performance of the system 100 (DKMA-ULD framework) is evaluated against previous methods in the literature, as shown in Table 1 below, which provides comparison of DKMA-ULD with previous state-of-the-art ULD methods. sensitivity (%) at different false-positives (FP) per sub-volume on the volumetric test-set of DeepLesion dataset. Here, CT-slices are fed, after performing cropping of black-borders during preprocessing, to the network (training with ImageNet pre-trained weights).

TABLE 1

| Technique | windows | FP@0.5 | FP@1.0 | FP@2.0 | FP@4.0 | Avg |
|---|---|---|---|---|---|---|
| 3DCE(27slices) | 1 | 62.48 | 73.37 | 80.70 | 85.65 | 75.55 |
| Improved RetinaNet (3 slices) | 1 | 72.18 | 80.07 | 86.40 | 90.77 | 82.36 |
| MVP net (9 slices) | 3 | 73.83 | 81.82 | 87.60 | 91.30 | 83.64 |
| MULAN (27 slices w/o tags) | 1 | 76.10 | 82.50 | 87.50 | 90.90 | 84.33 |
| MULAN (27 slices with 171 tags) | 1 | 76.12 | 83.69 | 88.76 | 92.30 | 85.22 |
| MELD (9 slices) | 1 | 77.80 | 84.80 | 89.00 | 91.80 | 85.90 |
| MELD + MAM + NRM (9 slices) | 1 | 78.60 | 85.50 | 89.60 | 92.50 | 86.60 |
| (a) DLMA ULD | 5 | 78.10 | 85.26 | 90.48 | 93.48 | 86.88 |

TABLE 1-continued

| Technique | windows | FP@0.5 | FP@1.0 | FP@2.0 | FP@4.0 | Avg |
|---|---|---|---|---|---|---|
| (b) + Self-Supervision | 5 | 78.75 | 85.95 | 90.48 | 93.48 | 87.16 |

Experiments demonstrate that by using only 3 slices per patient (subject), the DKMA-ULD framework outperforms all the previous state-of-the-art ULD methods at different FP per image and achieves an average sensitivity of 86.88% when ImageNet pre-trained weights are used for the backbone initialization. Here, one important thing to note is that although MELD (with missing annotation matching (MAM) and negative region mining (NRM)) gives an almost similar sensitivity value (86.60%) as that of DKMA-ULD (86.88%), MELD is trained on a vast variety of heterogeneous datasets as compared to DKMA-ULD framework, which is trained only on one type of dataset such as the DeepLesion dataset. Therefore, it is evident that the introduction of domain-specific features and multi-head attention-based feature fusion have enabled DKMA-ULD framework to learn robust representations, wherein that domain knowledge alleviates the requirement of a set of diverse datasets for learning good representations in medical imaging analysis. Furthermore, experiments were carried out by initializing DKMA-ULD framework network with self-supervised weights. As shown in Table 1, it leads to a gain in performance achieving a final average sensitivity of 87.16%. For more results on organ-wise sensitivity, refer supplementary material. Next, we show a comparison of average sensitivity for different lesion sizes and organs. It is observed from the FIG. 4(a) that DKMA-ULD improves the detection of very small (<10 mm) and medium-sized (10-30 mm) lesions over 3DCE and improved RetinaNet. Further, from FIG. 4(b), it is observed that the method disclosed herein that including domain-specific information in the lesion detection network improves the average sensitivity across all organs present in the dataset. For all the above experiments, cropped CT slices were used by clipping the black border region to focus on the region of interest. Further, the ablation study is presented on the introduction of different modules in the disclosed lesion detection pipeline, as shown in Table 2. The 5 HU windows approach used by the method for organ-specific domain knowledge, results in an improvement of approximately 2% in the average sensitivity (82.37%), as shown in row 3 of Table 2. Subsequent to this, when experimented with the inclusion of disclosed convolution augmented multi-head attention module for feature fusion and custom anchors to detect varied-sized lesions effectively, it is observed that a performance boost is obtained by achieving an average sensitivity of 84.23%. All the ablation experiments are performed on CT-slices without applying cropping during the pre-processing step.

Later during the experiments, feature extraction backbone is replaced with ResNeXt-152 and clip black borders in CT slices enabling the network to focus only on the region of interest. This resulted in a quantitative improvement by achieving a state-of-the-art average sensitivity of 86.88%. Table 2 depicts Ablation studies and average sensitivity comparison (%) of introducing different modules in the proposed lesion detection (DKMA-ULD) on the test-set of the DeepLesion dataset. *CT-slices after cropping of outer black-region are used for this experiment

TABLE 2

| Sr. No | HU windows | Backbone | Custom attention | Custom anchors | Avg. Sensitivity |
|---|---|---|---|---|---|
| 1 | 1 | ×101 | | | 77.59 |
| 2 | 3 | ×101 | | | 80.66 |
| 3 | 5 | ×101 | | | 82.37 |
| 4 | 5 | ×101 | Yes (Y) | | 83.30 |
| 5 | 5 | ×101 | Y | Y | 84.23 |
| 6 | 5 | ×152 | Y | Y | 84.85 |
| 7* | 5 | ×152 | Y | Y | 86.88 |

Figure 5:
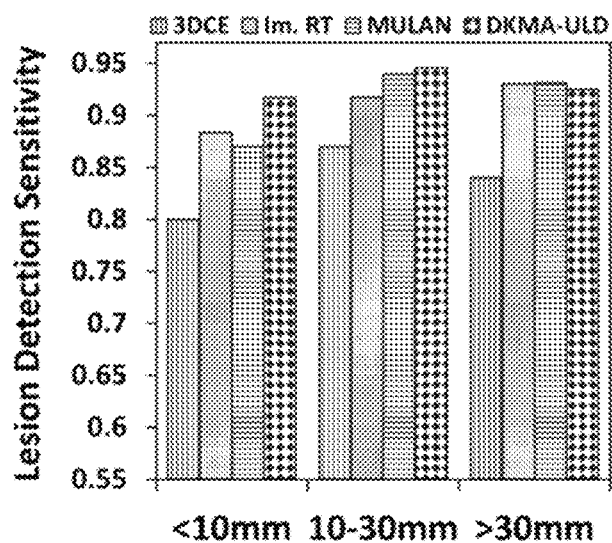
FIG. 5 depicts sensitivity (at False Positive (FP)=4) comparison of the system against state-of-the-art techniques for different lesion sizes and average sensitivity (over FP={0.5,1,2,4}) organs of the region of interest, in accordance with some embodiments of the present disclosure.
Figure 5:
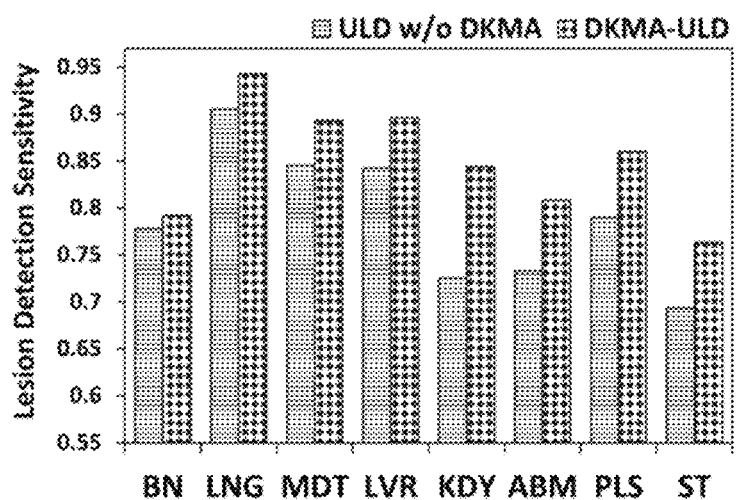
Figure 6A:
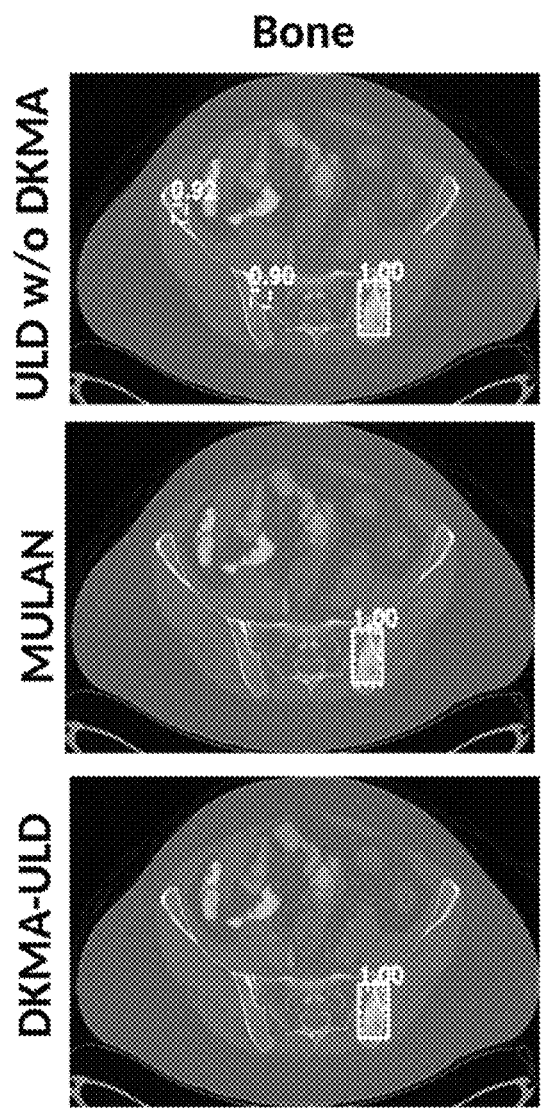
FIGS. 6A through 6D depict lesion detection performance of the system for different regions of interest compared against a prior art, ground truth, true positive and false positive, in accordance with some embodiments of the present disclosure.
Figure 6B:
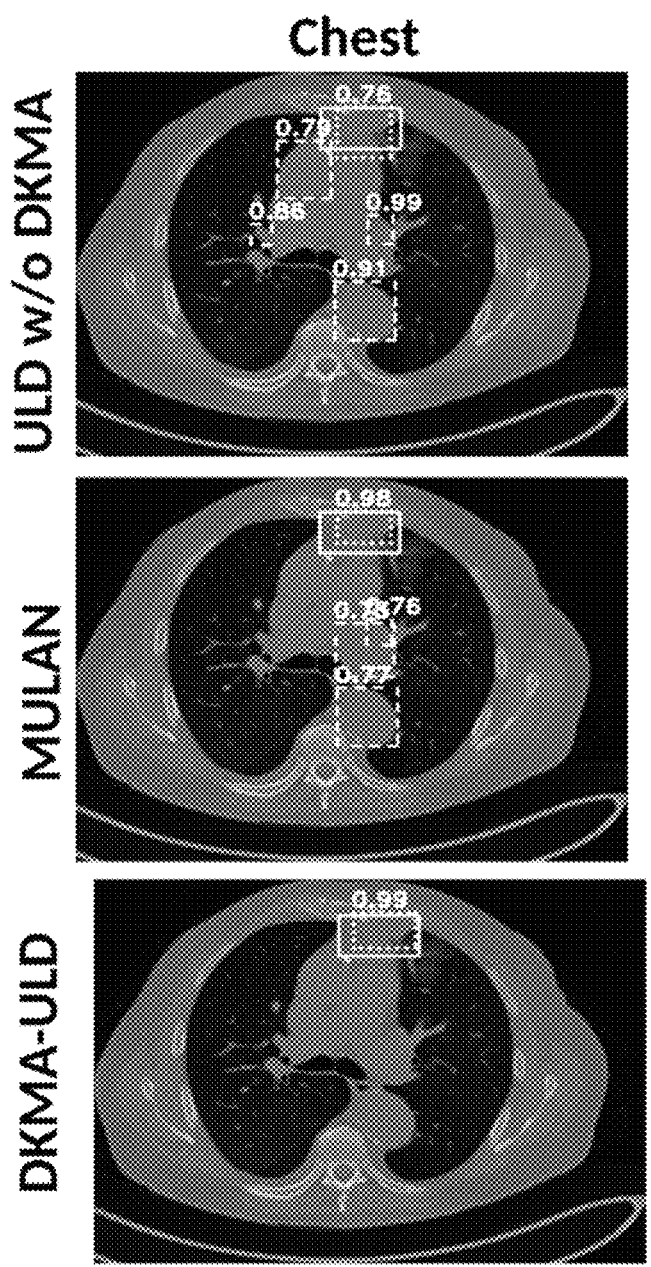
Figure 6C:
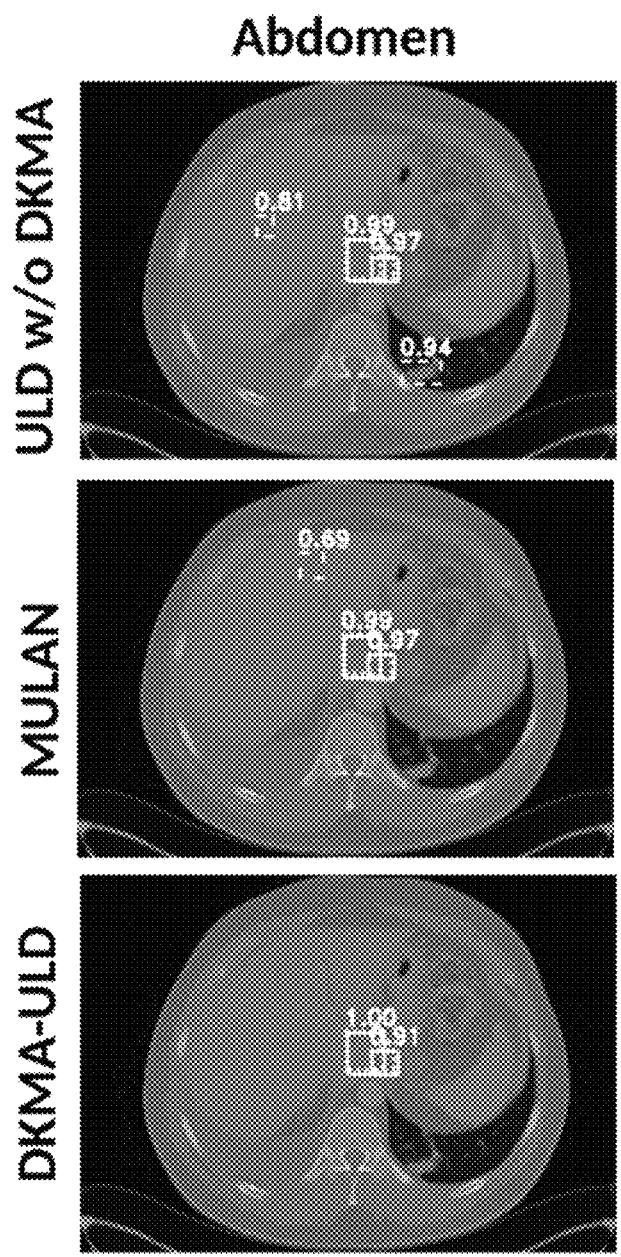
Figure 6D:
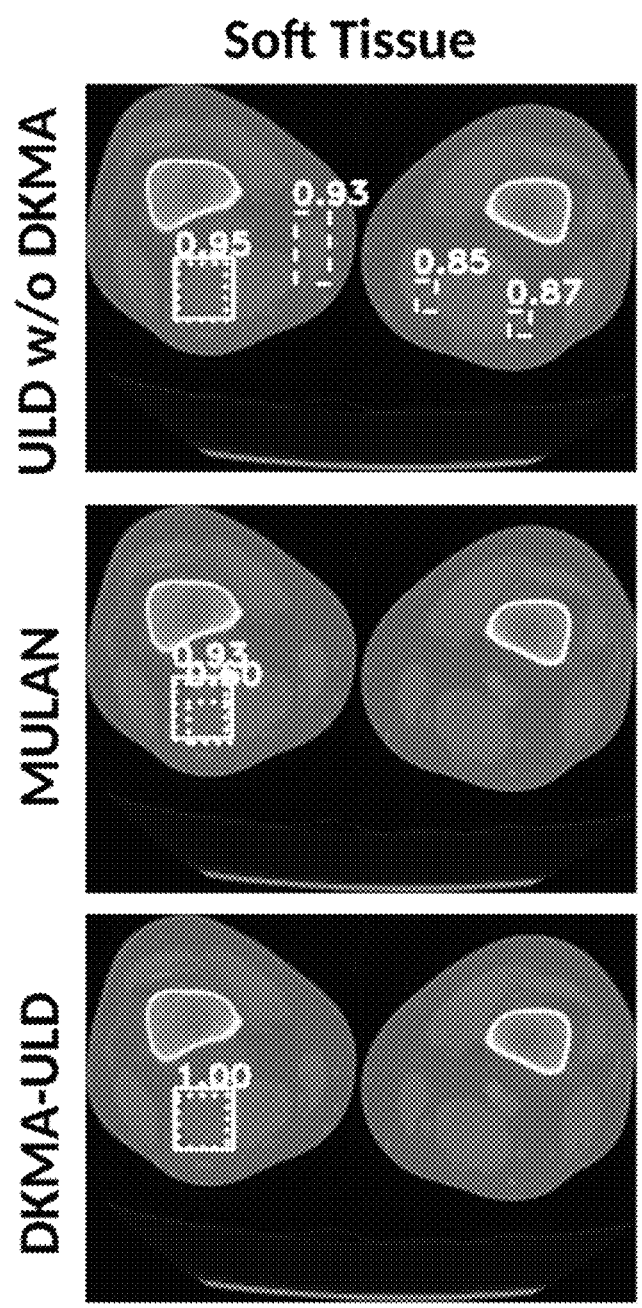

Qualitative performance of our the DKMA-ULD is depicted in the form of reduction of FP in FIG. 5. FIG. 5 depicts average sensitivity comparison for different lesion sizes and organs. In FIG. 5(a) average Sensitivity (over FP=0.5,1,2 and 4) for lesions with 3 different size ranges is compared with MULAN and the DKMA-ULD framework is depicted. In FIG. 5(b) comparison of organ-wise average sensitivity of MULAN and DKMA-ULD.

FIGS. 6A through 6D depict detection results rate of 2 false positive (FP) of DKMA-ULD on CT-scans of different body regions (subject's RoI). The system 100 is compared with, the state of the art MULAN, with and without domain knowledge. The solid line, dotted line, and dashed line boxes represent ground-truth, true-positive (TP), and false-positive (FP) lesion detections, respectively. Please note that ULD w/o DKMA represents when 3 slices with only one HU window ([1024;4096]), default anchors, and without convolution augmented multi-head attention feature fusion are used. We can observe that after incorporating domain knowledge in the form of multi-intensity CT slices, custom anchors, and multi-head attention (i.e., DKMA-ULD), the number of FP reduced drastically resulting in improved lesion detection performance.

Thus, the method and system disclosed herein performs robust detection of lesions across all organs of the body using 5 HU windows, computed in an unsupervised manner, for highlighting the different organs of the body in CT-scans and self-attention based feature aggregation which make DKMA-ULD framework organ agnostic. Thus, for any changed subRoI from chest to abdomen or any other, the HU windows and the architecture does not require any modification, dedicated learning still provides lesions detection with consistent accuracy across different organs of the body. It also demonstrates that the explicit incorporation of domain knowledge into the deep network alleviates the need of using a large number of heterogenous datasets and enables the network to learn maximum information with limited number of slices per patient's CT-scan.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for domain knowledge based Universal Lesion Detection (ULD), the method comprising:
receiving and preprocessing, by one or more hardware processors, a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI;
creating, by the one or more hardware processors, a 3-Dimensional context of the subRoI by defining a 3-channel input image based on each preprocessed slice of the slice set;
windowing using a windowing technique, by the one or more hardware processors, each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each pre-processed slice;
generating, by the one or more hardware processors, a feature map block corresponding to each of the organ agnostic HU windows by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window, wherein the each feature map block corresponding to each of the organ agnostic HU window comprises a set of sub-level feature maps at a plurality of FPN levels, with each FPN level having receptive fields of different resolution to capture features of one or more lesions having varying sizes;
generating, by the one or more hardware processors, a fused feature map block (F') using a convolution augmented attention module that applies feature fusion on the feature map block corresponding to each of the organ agnostic HU window, wherein the convolution augmented attention module:
i) concatenates the set of sub-level feature maps of the feature map block for each of the organ agnostic HU window to obtain a concatenated multi-view feature map block,
ii) utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory,
iii) convolutes down each of the sub-level feature maps to a lower dimension using the multi-headed self-attention module to provide a compressed channel information, and
iv) utilizes the compressed channel information to generate Key, Query and Value matrix to match a predefined number of output channels, wherein outputs from the learnable 2D convolution layer and the multi-headed self-attention module are concatenated; and
predicting, by the one or more hardware processors, one or more lesions of varying sizes in the preprocessed slice set by analyzing the fused feature map block (F') using a Region proposal Network (RPN), wherein the RPN generates bounding boxes and corresponding probability values across the one or more lesions of varying sizes from amongst a set of customized lesion specific anchors sizes.

2. The method of claim 1, further comprising training the shared feature extractor using a self-supervised learning (SSL) technique that applies medical domain specific weights during training for accurate extraction of lesions with varying sizes.

3. The method of claim 1, wherein preprocessing comprises border removal, normalizing, intensity value clipping, and rescaling of each slice.

4. The method of claim 1, wherein a differential evolution search algorithm is used to obtain the set of customized lesion specific anchor sizes.

5. A system for domain knowledge based Universal Lesion Detection (ULD), the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive and preprocess a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI;
create a 3-Dimensional context of the subRoI by defining a 3-channel input image based on each preprocessed slice of the slice set;
window, using a windowing technique, each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each pre-processed slice;
generate a feature map block corresponding to each of the organ agnostic HU window by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window, wherein the each feature map block corresponding to each of the organ agnostic HU window comprises a set of sub-level feature maps at a plurality of FPN levels, with each FPN level having receptive fields a different resolution to capture features of one or more lesions having varying sizes;
generate a fused feature map block (F') using a convolution augmented attention module that applies feature fusion on the feature map block corresponding to each of the organ agnostic HU window, wherein the convolution augmented attention module:
  i) concatenates the set of sub-level feature maps of the feature map block for each of the organ agnostic HU window to obtain a concatenated multi-view feature map block,
  ii) utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory,
  iii) convolutes down each of the sub-level feature maps to a lower dimension using the multi-headed self-attention module to provide a compressed channel information, and
  iv) utilizes the compressed channel information to generate Key, Query and Value matrix to match a predefined number of output channels, wherein outputs from the learnable 2D convolution layer and the multi-headed self-attention module are concatenated; and
predict one or more lesions of varying sizes in the preprocessed slice set by analyzing the fused feature map block (F') using a Region proposal Network (RPN), wherein the RPN generates bounding boxes and corresponding probability values across the one or more lesions of varying sizes from amongst a set of customized lesion specific anchors sizes.

6. The system of claim 5, wherein the one or more hardware processors 104 are further configured to train the shared feature extractor using a self-supervised learning (SSL) technique that applies medical domain specific weights during training for accurate extraction of lesions with varying sizes.

7. The system of claim 5, wherein preprocessing comprises border removal, normalizing, intensity value clipping, and rescaling of each slice.

8. The system of claim 5, wherein the one or more hardware processors 104 are further configured to utilize a differential evolution search algorithm is to obtain the set of customized lesion specific anchor sizes.

9. One or more non-transitory machine-readable information storage mediums comprising one or more instructions which when executed by one or more hardware processors cause:
  receiving and preprocessing, a slice set, from amongst a plurality of slices of a Computed Tomography (CT) scan of a subject, the slice set comprising i) a key slice of a subject's Region of Interest (subRoI) and ii) a superior slice and an inferior slice in neighborhood of the key slice of the subRoI;
  creating, a 3-Dimensional context of the subRoI by defining a 3-channel input image based on each preprocessed slice of the slice set;
  windowing using a windowing technique, each preprocessed slice of the slice set of the subRoI in accordance with a plurality of heuristically determined organ agnostic Hounsfield Unit (HU) windows with varying pixel intensities and highlighting varying organs, wherein a set of HU windowed images is created for each pre-processed slice;
  generating a feature map block corresponding to each of the organ agnostic HU windows by extracting a plurality of feature maps, using a shared feature extractor comprising a feature pyramid network (FPN) applied on HU windowed images from amongst the set of HU windowed images of each of the preprocessed slice that fall under same window range of an organ agnostic HU window, wherein the each feature map block corresponding to each of the organ agnostic HU window comprises a set of sub-level feature maps at a plurality of FPN levels, with each FPN level having receptive fields of different resolution to capture features of one or more lesions having varying sizes;
  generating, a fused feature map block (F') using a convolution augmented attention module that applies feature fusion on the feature map block corresponding to each of the organ agnostic HU window, wherein the convolution augmented attention module:
    i) concatenates the set of sub-level feature maps of the feature map block for each of the organ agnostic HU window to obtain a concatenated multi-view feature map block,
    ii) utilizes a combination of a learnable 2D convolution layer for pooling multi-view features and a multi-headed self-attention module providing channel and spatial attention, wherein the learnable 2D convolution layer is augmented in parallel to the multi-headed self-attention module to reduce computational burden of the convolution augmented attention module, and number of output channels of the convolution augmented attention module are divided between the learnable 2D convolution layer and the multi-headed self-attention module based on allowed computational memory,
    iii) convolutes down each of the sub-level feature maps to a lower dimension using the multi-headed self-attention module to provide a compressed channel information, and
    iv) utilizes the compressed channel information to generate Key, Query and Value matrix to match a predefined number of output channels, wherein outputs from the learnable 2D convolution layer and the multi-headed self-attention module are concatenated; and
  predicting one or more lesions of varying sizes in the preprocessed slice set by analyzing the fused feature map block (F') using a Region proposal Network (RPN), wherein the RPN generates bounding boxes and corresponding probability values across the one or more lesions of varying sizes from amongst a set of customized lesion specific anchors sizes.

10. The one or more non-transitory machine-readable information storage mediums of claim 9, wherein the one or more instructions which when executed by the one or more hardware processors further cause training the shared feature extractor using a self-supervised learning (SSL) technique that applies medical domain specific weights during training for accurate extraction of lesions with varying sizes.

11. The one or more non-transitory machine-readable information storage mediums of claim 9, wherein preprocessing comprises border removal, normalizing, intensity value clipping, and rescaling of each slice.

12. The one or more non-transitory machine-readable information storage mediums of claim 9, wherein a differential evolution search algorithm is used to obtain the set of customized lesion specific anchor sizes.

\* \* \* \* \*